May 1, 1923.

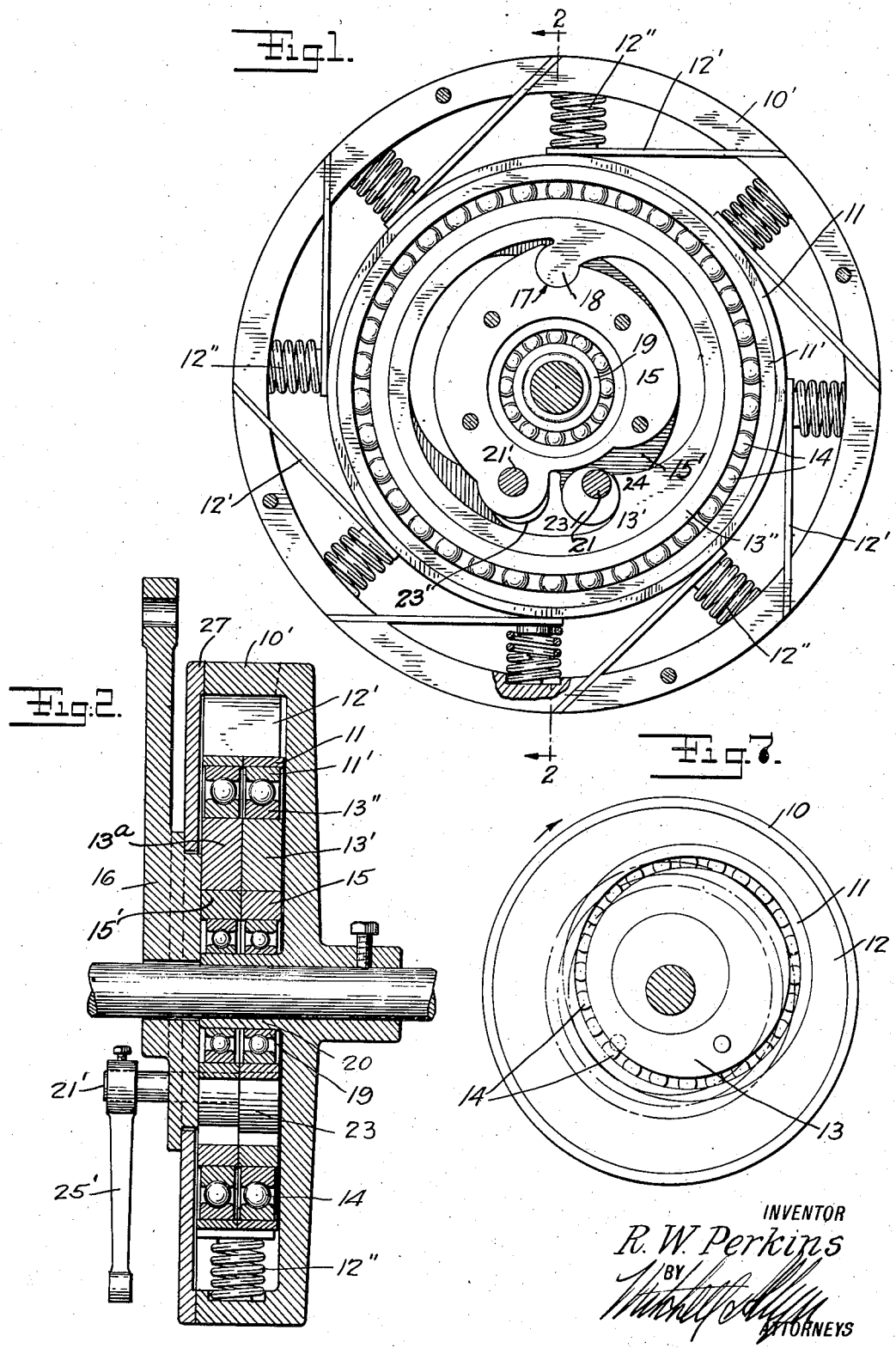

R. W. PERKINS 1,453,600

BRAKE

Filed June 8, 1921

INVENTOR
R. W. Perkins
BY
ATTORNEYS

Patented May 1, 1923.

1,453,600

UNITED STATES PATENT OFFICE.

ROBERT W. PERKINS, OF NORWICH, CONNECTICUT.

BRAKE.

Application filed June 8, 1921. Serial No. 475,972.

*To all whom it may concern:*

Be it known that I, ROBERT W. PERKINS, a citizen of the United States of America, residing at Norwich, Connecticut, have invented a new and useful Brake, of which the following is a specification.

My invention relates to mechanism for braking or retarding rotative movement of parts.

The main object is to provide mechanism operating on a compression resistance with a minimum of friction.

In carrying out my invention, I utilize two normally concentric members one of which is rotatable and the other non-rotatable. One member is displaceable eccentrically with relation to the other, and resilient means is interposed between the two members which when there is a relative eccentric displacement, must be compressed in order to permit relative rotation. Such compression consumes energy and retards relative rotative movement.

Fig. 1 is a side view of a brake embodying improvements of my invention, parts being removed in order to better illustrate interior mechanism.

Fig. 2 is a sectional view on the plane of the line 2—2 of Figs. 1 and 3.

Fig. 7 is a side view on a smaller scale showing a more or less diagrammatic view of a modification illustrating the principle of the invention.

Figure 4:
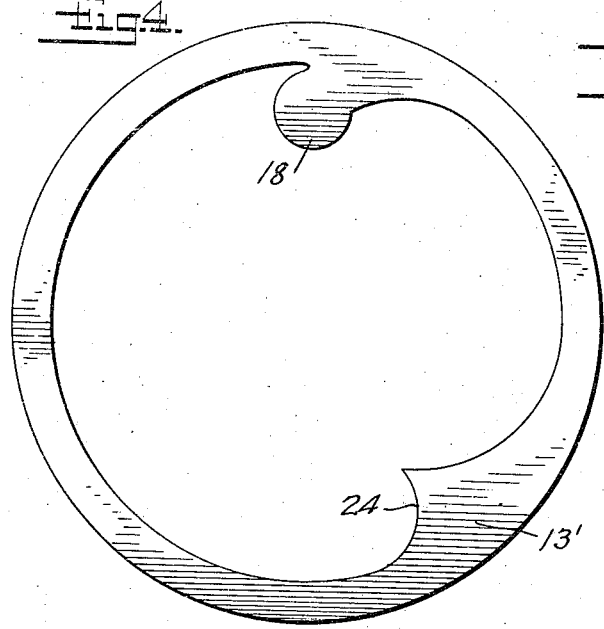
Figs. 4 and 5 are side views of details of the mechanism.
Figure 5:
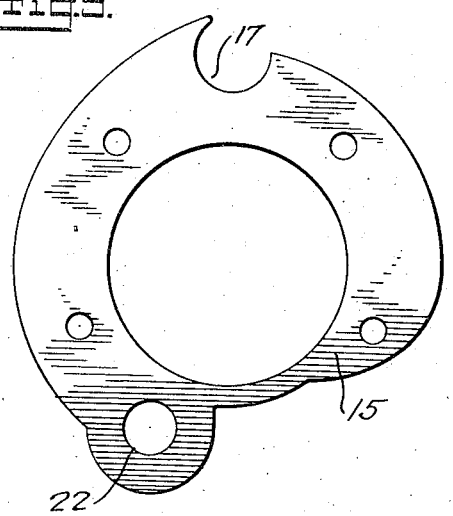

The two rings 10 and 11 in Fig. 7 are normally concentric and rotatable. Between these two rings is a compressible member 12, such for instance as a body of relatively resilient rubber. Within the inner ring is a non-rotatable disc or ring 13 and between the members 11 and 13 is an anti-friction bearing 14 of rollers or balls. When the rings 10 and 11 are concentrically located, it is clear that they may rotate and may carry around with them the interposed resilient member 12, and the only resistance to rotation will be the friction of the bearing 14. If the inner member 13 and the bearing 14 are eccentrically displaced with relation to the outer ring member 10 as indicated by the full lines in Fig. 7, the resilient material 12 will be compressed, which of course requires the exercise of force. As the outer member rotates, it will carry with it the resilient material into the contracted upper right hand space between the rings 10 and 11 so that the material 12 is being continually compressed and a braking offect produced upon the rotatable member 10.

Figure 3:
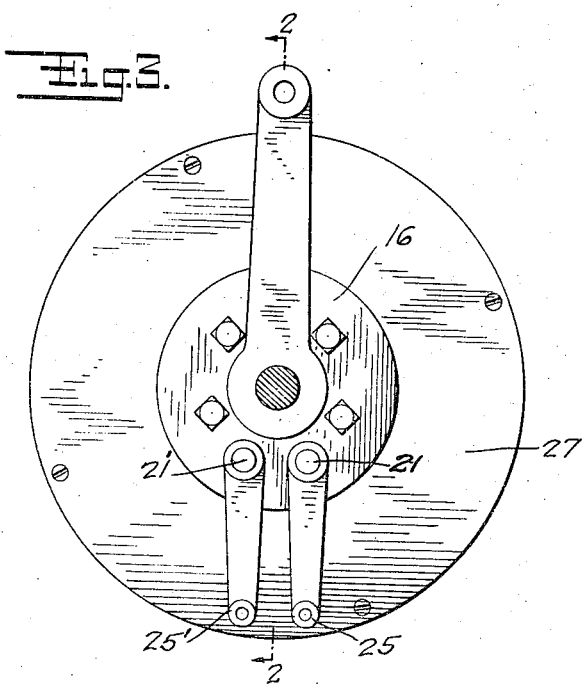
Fig. 3 is a side view of a complete device shown on a smaller scale.
Figure 6:
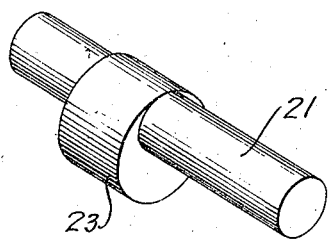
Fig. 6 is a perspective view of another detail.

In the form of construction shown in the other figures of the drawing, the resilient member 12 is replaced by a series of spring shoes 12' carried by the ring or housing 10' and rotatable therewith. These may be backed up with other springs such as 12''. These spring devices press toward the ring 11. Between the ring 11 and the member 13' is interposed an anti-friction bearing consisting of the bearing rings 11' and 13'' and the balls or rollers 14. Member 13' is supported by a member 15 which is secured to the stationary part 16. One method of support is to provide the member 15 with a recess 17 in which the knuckle 18 rests. An anti-friction bearing 19 is interposed between the member 15 and the hub 20 of the housing 10' so as to keep the member 15 in position with a relatively small amount of friction. The stud 21 has a cam 23 which coacts with the bearing surface 24. This stud 21 may be pivoted in a member 15' which is like member 15. The outer end of the stud 21 may be provided with an arm 25 suitable for rocking the same and throwing the cam 23 against the bearing 24. When the cam is oscillated or rocked about the axis of the stud 21, it displaces the inner ring 13' which turns on the knuckle 18 and thus displaces the ring 11 with relation to the ring 10' and compresses one or more of the spring devices which happen to be in the general line of the direction of displacement. In order for the outer ring 10' to continue to rotate, it must interpose the next compressible spring device so that one or more of the spring devices are successively compressed. This consumes energy and produces the braking effect desired. In the particular form shown, I have illustrated a duplicate set of displaceable inner members as shown in Fig. 2, one of which is adapted to be operated by movement of the arm 25 and the other by movement of the arm 25' shown in Fig. 3. The stud 21' pivoted in the ear 22 of the member 15 has a cam 23' to engage a ring 13ª which is like 13'. I thus provide two separately operable brakes for instance one for ordinary running and one for emergency purposes. The housing may be closed or covered by a ring 27.

In the ordinary brake, friction is applied in some form and if the brake is used for any length of time heats up the parts sometimes to the point of destruction. In the non-friction or compressive type of brake herein shown and described, friction is eliminated as much as possible and the resistance to motion secured by springs so placed in the moving body that when required they offer substantially continuous opposition to motion so that the rotating wheel or pulley can only continue its rotation by successive compression or deflection of a series of springs. The braking effect is equal to the power required to compress the springs and this may be increased or decreased by changing the position of the deflecting member. It should be understood that I consider that any form of spring may be used within the broad scope of my invention. It should be understood that I consider that the invention may be embodied in other forms than those herein illustrated and that the terms of the claims are not to be construed as limitations except so far as required by the state of the art.

To operate the brake power is applied through the usual foot pedal or emergency lever (not shown) to move lever 25 or 25'. If lever 25 is moved to the right (Fig. 3) the cam 23 will turn counter clockwise (Fig. 1) and engaging bearing 24 swing the ring 13' to the right. This displaces the bearing rings 13'' and 11' and the ring 11 and compresses the springs at the right which of course are being carried around with the outer housing ring member 10' on the main shaft. As it requires power to rotate new springs into the contracted space between rings 11 and 10' the ring 10' or brake housing is retarded.

I claim:

1. In a device of the character described, two concentrically mounted members one within the other and one of which is composed of inner and outer rings with a series of springs between the rings and means for displacing one of said members eccentrically of the other to compress the springs at one side.

2. In a device of the character described, a housing having a hub and a rim, a support on said hub, an inner bearing ring mounted to swing on said support, an outer bearing ring rotatable about the inner ring, and a series of springs mounted between said housing and said outer bearing ring.

3. In a device of the character described, a housing having a hub, a support, an anti-friction bearing between hub and support, an eccentrically displaceable bearing ring carried by the support, and a resilient retardation member interposed between said ring and said housing.

4. In a device of the character described, a support, an eccentrically displaceable bearing ring carried by said support, an eccentric cam carried by said support for displacing said ring, a rotatable member and resilient mechanism interposed between said ring and said member.

5. In a brake mechanism, an outer rotatable member, an inner support, a bearing member pivoted to swing thereon and anti-friction means and compression means interposed between said outer member and said bearing member.

6. In a brake mechanism, a rotatable housing, spring means carried thereby, an eccentrically displaceable member pivoted to swing within said housing, and an anti-friction device between said spring means and said displaceable member.

7. In a brake mechanism, a rotatable housing having a hub, a support, anti-friction means between said support and said hub, a ring carried by said support and adapted to be eccentrically displaced with relation to said hub, and resilient members interposed between said ring and said housing.

8. In a brake mechanism, a housing having a hub, a support mounted thereon, a ring mounted to swing on said support, an anti-friction bearing carried by said ring and resilient means mounted between said bearing and said housing.

9. Brake mechanism comprising a rotatable member, a series of springs carried thereby, a rotatable ring, an anti-friction bearing for said ring, and means for laterally displacing said ring to cause it to successively compress said springs as said rotatable member rotates.

10. In a device of the character described, two normally concentric annular members with bearing balls between them, one of said members being pivoted eccentrically of the other member, and the other member being composed of outer and inner rings with a series of springs between them.

11. In a device of the character described, two ball bearing rings, balls between them, a swinging support for one ring, a rotatable companion member for the other ring and a series of springs connected between said rotatable member and its companion ring.

12. In a device of the character described, two ball bearing rings, balls between them, a support for one ring, means for eccentrically displacing said support and said ring, a rotatable companion member for the other ring and a series of springs connected between said rotatable member and its companion ring.

13. In a device of the character described, two normally concentric rings, springs interposed between said rings, a ball bearing support for one of said rings and pivoted means for swinging one ring with respect to the other to displace the same eccentrically and compress said springs.

14. In a device of the character described, a support having a recess at one edge, a bearing ring having a knuckle seated in said recess, a cam for engaging the opposite side of said ring to displace the same, a rotatable member and a series of springs interposed between said member and said ring.

ROBERT W. PERKINS.